United States Patent [19]

Nakajima

[11] Patent Number: 4,641,632
[45] Date of Patent: Feb. 10, 1987

[54] HEATING IRON USING LIQUEFIED GAS
[75] Inventor: Masahiko Nakajima, Tokyo, Japan
[73] Assignee: Nakajima Dokosho Company Limited, Tokyo, Japan
[21] Appl. No.: 758,803
[22] Filed: Jul. 25, 1985
[30] Foreign Application Priority Data Jul. 30, 1984 [JP] Japan .................................. 59-159851

[51] Int. Cl.⁴ ................................................ B23K 3/02
[52] U.S. Cl. ..................................... 126/413; 126/406
[58] Field of Search ............... 126/413, 403, 406, 237, 126/238, 231–234

[56] References Cited

U.S. PATENT DOCUMENTS 2,807,317  9/1957  Penno ................................... 126/413
3,463,601  8/1969  Childree .............................. 431/158
4,133,301  1/1979  Fujiwara .............................. 126/413

Primary Examiner—Carroll B. Dority, Jr.
Attorney, Agent, or Firm—Cushman, Darby & Cushman

[57] ABSTRACT

A heating iron utilizing the heat obtained through complete catalytic combustion of liquefied gas comprises a catalyst combustion chamber having an inner gas flow channel confined therein and in direct connection with a gas mixture generating means and a pre-heating zone disposed to the outer circumferential surface of the catalyst combustion chamber, in which the pre-heating zone is heated upon start of the catalytic combustion to heat the catalyst layer in the catalyst combustion chamber to a temperature sufficient for starting the catalytic oxidizing reaction in a flameless manner.

5 Claims, 10 Drawing Figures

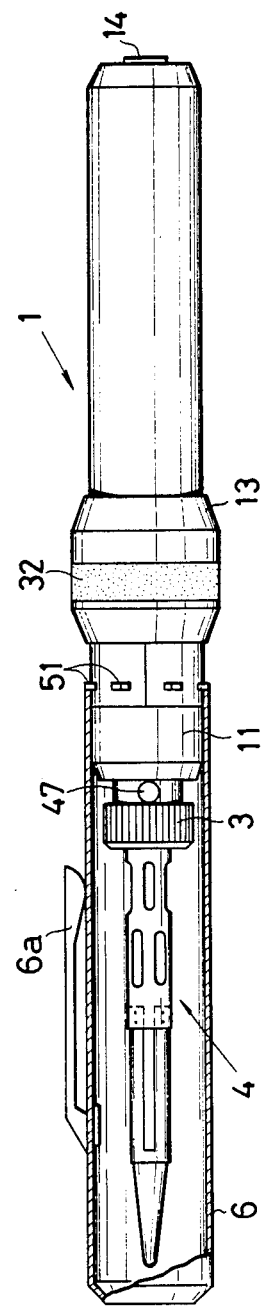
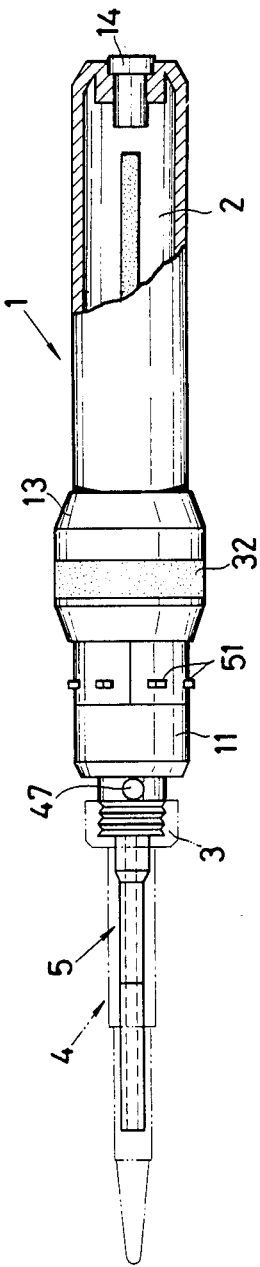

HEATING IRON USING LIQUEFIED GAS

BACKGROUND OF THE INVENTION

1. Field of the Invention

This invention concerns a heating iron utilizing the combustion heat of a liquefied gas and, more specifically, it relates to a heating iron using a liquefied gas and capable of providing flameless and complete catalytic combustion.

2. Description of the Prior Art

Heating irons using liquefied gas as a heat source and utilizing a combustion catalyst for the aid of flameless complete combustion have been proposed, for example, as disclosed in Japanese Patent Publication Nos. 6033/1970 and 29789/1970.

In the conventional heating irons of this type, a gas mixture of air and fuel gas (liquefied gas) is introduced to a combustion chamber, where it is completely burnt by the aid of an oxidizing reaction with a combustion catalyst. In this case, the gas mixture is at first ignited and burnt upstream of the combustion chamber by using gas lighter or the like other ignition means (pre-combustion), and the heat obtained therefrom is used to heat the combustion catalyst to a temperature sufficiently high to start the catalytic oxidizing reaction. Then, the exhaust from the pre-combustion containing still combustible components is subjected to flameless complete catalytic combustion in the combustion chamber.

In this system, however, since a portion of the gas mixture has already been burnt in pre-combustion upstream of the combustion chamber, combustion heat energy is wholly it available at the iron tip but it is partially dissipated wastefully to the surrounding portion of the tool.

Moreover, gas flame resulted from the pre-combustion (not catalytic but ordinary combustion) provides a danger of fire accidents. As is well-known, if an exposed flame is present, it will readily ignite vapors of burnable organic solvents, etc which are often used in the production lines of a electronics or other factories.

In view of the above, use of gas heating iron is severely inhibited in most factories and they are obliged to use electrical heating irons. However, the electrical heating iron presents other drawbacks of current leak or electrostatic induction which are, particularly, to sensitive electronic elements as described in our copending U.S. patent application Ser. No. 620,326, now U.S. Pat. No. 4,552,124.

The present inventor has already proposed an improved gas heating iron in the above-cited U.S. Patent application, in which flaming pre-combustion takes place only at the beginning stage, then the gas supply is interrupted and the flame is extinguished soon after the catalyst has been heated to a temperature at which the oxidizing catalytic reaction can be started, by the use of a shutter mechanism.

Subsequently, when the gas mixture is supplied again, flameless complete combustion can be started and continued with the catalyst already heated to the high temperature. This can substantially overcome the foregoing defects and our proposed heating irons have now been successfully employed by many users.

However, the present inventor, et al have still continued to develop a more improved gas heating iron, because the use of the shutter mechanism complicates the structure, unskilled workers may feel it troublesome to handle the shutter or the like and, in particular, because we intend to attain quite flameless combustion even at the ignition stage so that the heating iron can be used with no fire danger at all.

OBJECT OF THE INVENTION

It is, accordingly, an object of this invention to provide a heating iron using liquefied gas, which can be operated in a quite flameless manner including the initial ignition stage.

Another object of this invention is to provide a heating iron using liquefied gas which is simple in structure and easy to handle.

It has been unexpectedly found that the catatalyst can be externally pre-heated without requiring flaming pre-combustion and attain a sufficient temperature in a few seconds to initiate the oxidizing reaction. It has also been found essential that the gas flow path should completely be confined to the inside of the catalyst chamber and that a pre-heating zone formed to the circumferential periphery of the chamber so that the gas mixture is burnt only at the portion in contact with the catalyst component but not with external atmosphere.

SUMMARY OF THE INVENTION

The above described objects of this invention can be attained by a heating iron using liquefied gas comprising:

a nozzle for jetting out a combustible gas from a liquefied gas reservoir, a gas mixture generating means disposed at the exit of said nozzle for attracting to mix an external air with the combustible gas by the ejector effect of the combustible gas jetted out from the nozzle thereby forming a gas mixture, a catalyst combustion chamber disposed at the downstream of the gas mixture generating means and having a gas flow channel deposited with a catalyst layer at the gas channel wall, and an iron tip member at least partially surrounding the catalyst chamber for conducting the heat from the catalyst combustion chamber to a work, wherein the catalyst combustion chamber comprises:

an inner gas flow channel (or channels) that passes (or pass) through the chamber along the gas flowing direction while being completely surrounded and confined within the catalyst combustion chamber in direct contact with the gas mixture generating means and deposited with a catalyst layer on the channel wall and a pre-heating zone disposed for at least a portion on the outer circumferential surface of the catalyst combustion chamber that is pre-heated flamelessly upon ignition to such a temperature that the catalyst layer in contact with the gas mixture flowing through the gas flows channel (or channels) can take place oxidizing catalyst reaction, whereby the flameless combustion can be attained from the ignition stage of the gas combustion.

BRIEF DESCRIPTION OF THE DRAWINGS

These and other objects as well as advantageous features of this invention will be made clearer by reading the detailed descriptions for the preferred embodiments of this invention referring to the accompanying drawings, wherein FIG. 1 is a side elevational view, partially in cross section, of one embodiment according to this invention, FIG. 2 is a side elevational view, partially in cross section, of the embodiment shown in FIG. 1 with several of the parts being removed.

DESCRIPTION OF ILLUSTRATED EMBODIMENTS

Figure 3:
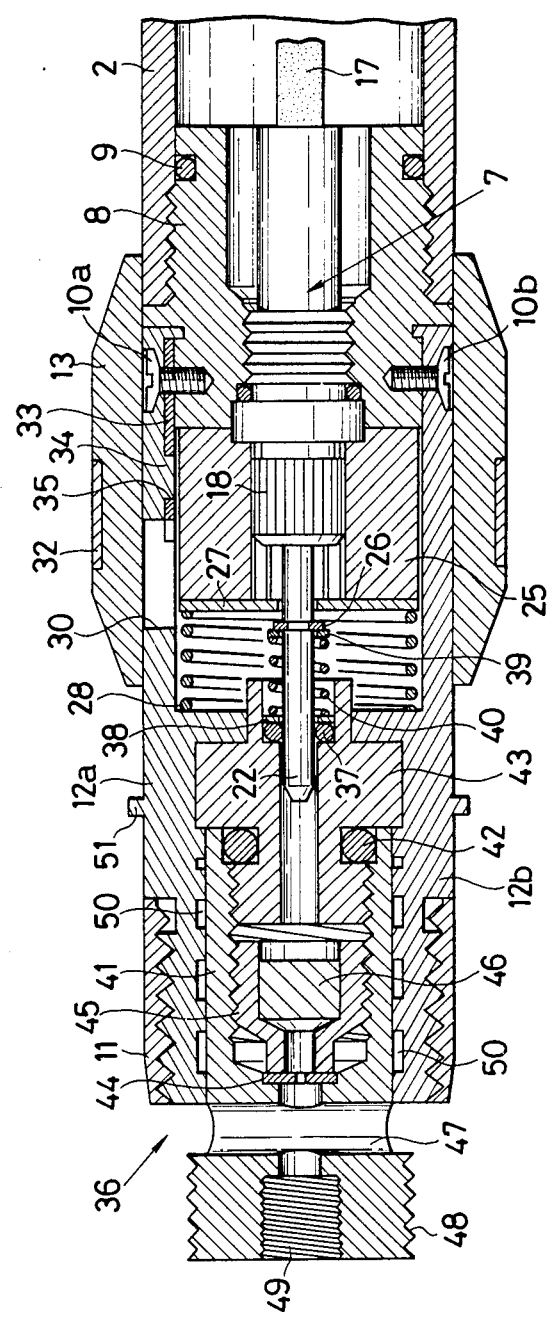
FIG. 3 is a cross sectional view showing the details for the inside of a grip portion.

This invention will be described by way of non-limitative embodiments thereof illustrated in the drawings.

FIG. 1 and FIG. 2 show one embodiment of this invention applied to a soldering iron using liquefied gases, in which a hollow grip 1 incorporates therein a gas reservoir 2 for liquefied gas. An iron tip member 4 is replaceably mounted by way of a mounting nut 3 to the top end of the grip 1 and the iron tip member 4 incorporates to the inside thereof in a non-contact manner a heating member 5 which is screw-coupled also in a replaceable manner to the top end of the grip 1. Further, a cap 6 having a retainer clip 6a is mounted at the top end of the grip 1 as shown in FIG. 1, so that the soldering iron can be retained safely in a worker's pocket or placed in a tool box even directly after the use.

As shown in FIG. 1 through FIG. 3, particularly in FIG. 3, the grip 1 comprises a control valve holder 8 in which a control valve 7 having both ON-OFF and flow rate control functions is screw-engaged coaxially in a gas tight manner, the gas reservoir 2 as described above is screw-coupled to the rear end of the control valve holder 8 by means of an O-ring 9, and vertically bisected upper half top end member 12a and a lower half top member 12b are secured at their respective rear ends to the top end of the control valve holder 8 by means of small screws 10a and 10b and integrated with each other at their respective top ends by a connection nut 11. Over the outer circumference at the rear end of both of the top end members 12a and 12b, a cylindrical control member 13 that controls the control valve 7 is mounted slidably both in the axial and the circumferential directions. A gas injection valve 14 is attached at the rear end of the gas reservoir 2.

Figure 4:
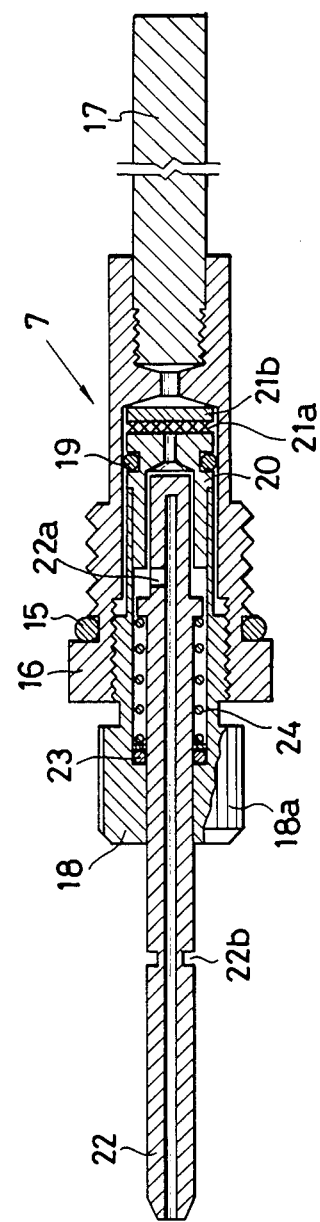
FIG. 4 is a cross sectional view showing the inner structure of a control valve.

As shown in FIG. 4, the control valve 7 has a valve casing 16 screw-coupled in a gas tight manner to the control valve holder 8 by means of an O-ring 15. A porous hose 17 is screwed into the base end of the valve casing 16 and extended to the inside of the gas reservor 2 for introducing the liquefied gas from the gas reservoir 2 into the valve casing 16. The porous hose 17 is made, for example, of synthetic resin of continuous cellular foam structure, braided fabrics of synthetic resin fibers or the likes.

Also, as shown in FIG. 4, a flow rate control member 18 having a knurled portion 18a around the outer circumference at the top end thereof is threading engaged from the top end to the inside of the valve casing 16, the axial movement of which can be adjusted by the rotation of the threads. A cylindrical retainer 20 is mounted to the base end of the flow rate control member 18 while being sealed in a plane-to-plane contact to the flow rate control member 18 and slidably sealed to the valve casing 16 by means of an O-ring 19. Further, gas restriction discs 21a, 21b are put between the base end face of the retainer 20 and the corresponding inner face of the valve casing 16.

The gas restriction disc 21a is made of material which is relatively soft and has a plurality of fine pore channels, while the gas restriction disc 21b is made of material which is relatively rigid and has less fine pore channels, so that the liquefied gas introduced by way of the porous hose 17 to the inside of the valve casing 16 may be evaporized during passage through both of the gas restriction discs 21a and 21b. When the flow rate control member 18 is rotated to adjust the urging force of the retainer 20 to both of the gas restriction discs 21a and 21b, the gas restriction discs (mainly, the disc 21a) are compressed to change the porosity and the amount of the gas passed therethrough is controlled in proportion to the threading advance of the flow control member 18.

To the inside of the flow rate control member 18 and the retainer 20 thus constituted, a cylindrical valve body 22 closed at the base end is incorporated axially slidably while being protruded at the top end thereof. The valve body 22 is sealed against the flow rate control member 18 by means of an O-ring 23 and normally urged resiliently toward the base end by means of a spring 24. In this normal state, as shown in FIG. 4, the base end of the valve body 22 is in contact with the inner circumferential surface of the retainer 20 to provide a gas-tight sealing, so that the gas passing through the gas restriction discs 21a and 22b are not supplied to the inside of the valve body 22 by way of a communication hole 22a formed to the valve body 22. On the other hand, when the valve body 22 is caused to slide toward the top end against the resiliency of the spring 24, the sealing contact between the valve body 22 and the retainer 20 is released allowing the gas from the gas restriction discs 21a and 21b to be introduced through the communication hole 22a to the inside of the valve body 22.

As shown in FIG. 3, a cylindrical actuator 25 is disposed over the outer circumference of the knurled portion 18a on the flow rate control member 18 of the control valve 7, and the actuator 25 slides axially to perform ON-OFF control for the control valve 7 and rotates circumferentially around the axis to perform flow rate control.

Figure 5:
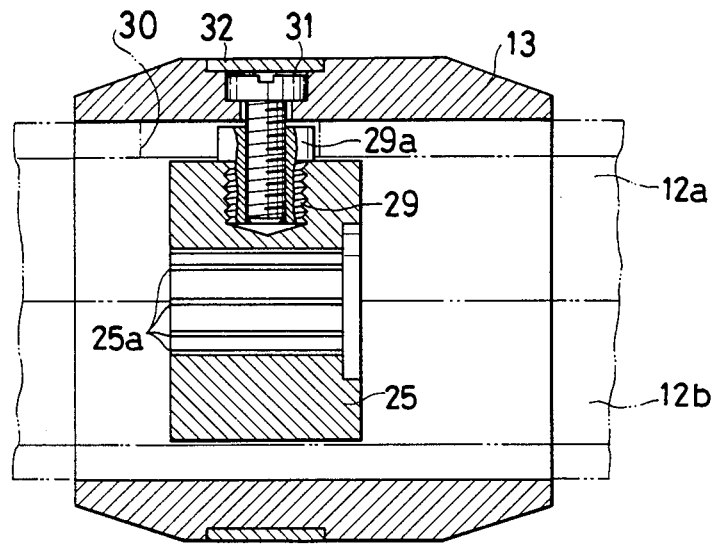
FIG. 5 is a cross sectional view showing the connected state between the control member and the actuation member.

As shown in FIG. 3 and FIG. 5, the actuator 25 has a plurality of ridges 25a formed at the inner circumferential surface thereof that engage the appropriate recesses of the knurled portion 18a on the flow rate control member 18, by which the actuator is connected to the flow control member 18 slidably in the axial movement and secured integrally for the circumferential movement. A disc 27 is disposed to the top end of the actuator 25, so that it abuts against an E-ring 26 mounted to the reduced-diameter portion 22b (refer to FIG. 4) of the valve body 22 as shown in FIG. 3 to cause the valve body 22 to slide toward the top end. The disc 27 is normally urged resiliently toward the base end together with the actuator 25 by a spring 28 incorporated to the inside of both of the top end members 12a and 12b.

Further, as shown in FIG. 5, a guide screw 29 having female threads at the inner circumference is screw-coupled to the outer circumferential surface of the actuator 25 and the disc-like head 29a of the guide screw 29 that projects to the outer surface of the actuator 25 is normally engaged into a guide hole 30 formed in the upper half top end member 12a. Further, a connection bolt 31 is screwed along the female threads formed at the inner circumference of the guide screw 29 for connecting the control member 13 with the actuator 25, and both of the members 12a and 12b 25 are interlocked completely. Further, an anti-slip ring 32, for example, made of rubber is secured to the outer circumferential surface of the control member 13 for the prevention of the slip.

Figure 6:
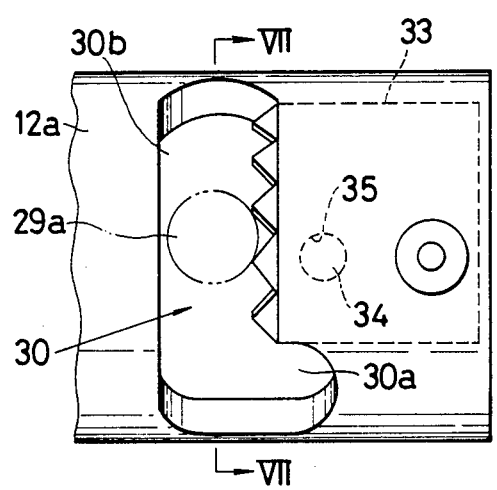
FIG. 6 is an explanatory view showing the relationship between the guide hole and the positioning plate disposed on a upper half top end member.
Figure 7:
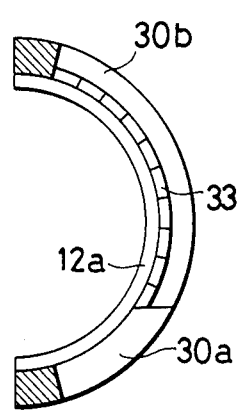
FIG. 7 is a cross sectional view taken along line VII—VII in FIG. 6.

As shown in FIG. 6 and FIG. 7, the guide hole 30 generally has an L-shaped configuration comprising an axial aperture 30a for guiding the axial sliding of the control member 13 and a circumferential aperture 30b for guiding the circumferential sliding of the member 13. Accordingly, when the control member 13 is caused to slide along the axial aperture 30a as a guide, the disc 27 abuts against the E-ring 26 to open the control valve 7. While on the other hand, when the control member 13 is caused to rotate slidingly along the circumferential aperture 30b as the guide, the flow rate control member 18 rotates together with the control member 13 integrally to perform the flow rate control.

Further, as shown in FIG. 6 and FIG. 7, the corrugating top end of a positioning plate 33 disposed at the inner surface of the upper half top end member 12a is protruded to the side edge on the base end of the circumferential aperture 30b, so that the head 29b of the guide screw 29 is engaged to any one of the bottoms of the corrugating portion for positioning upon flow rate control. The positioning plate 33 is formed with an aperture 35 for inserting a boss 34 disposed on the upper half end member 12a. The positioning plate 33 is secured together with the upper half top end member 12a to the valve control holder 8 by means of the set screw 10a as shown in FIG. 3.

While on the other hand, the top end of the valve body 22 is slidably inserted axially to the base end of a gas mixture generator 36 which is held securely between both of the top end members 12a and 12b as shown in FIG. 3. The valve body 22 and the gas mixture generator 36 is sealed by means of an O-ring 37. Further, two ring plates 38 and 39 and return spring 40 are respectively put between the O-ring 37 and the E-ring 26 as shown in FIG. 3 and the valve body 22 is normally urged resiliently toward the base end by the return spring 40.

As shown in FIG. 3, the gas mixture generator 36 comprises a gas mixture generating member 41 and a base end member 43 screw-coupled to the base end of the gas mixture generating member 41 in a gas tight manner by way of an O-ring 42. To the inside of the gas mixture generating member 41, are incorporated a nozzle plate 44 having a nozzle aperture of an accurate circular shape sized from 50 to 100 μm and, preferably, from 80 to 90 μm, a cylindrical retainer 45 for retaining the nozzle plate 44 and a filter 46, for example, made of a porous sintered alloy or the like with about 10 μm pore size, which is inserted and fixed to the inside of the retainer 45 as shown in FIG. 3.

Further, as shown in FIG. 1 through FIG. 3, at the exit of the nozzle plate 44 of the gas mixture generating member 41, is perforated an air introduction aperture 47 for attracting external air by the ejector action of the liquefied gas jetted out from the nozzle plate 44 to form a gas mixture. Further, at the top end of the gas mixture generating member 41, are formed a male threads 48 over which the mounting nut 3 is screw-coupled and female threads 49 in which the base end of the heating member 5 is screw-coupled respectively.

As shown FIG. 3, a plurality of ring grooves 50 are formed to the inner surface of both of the top end members 12a, 12b that hold therebetween the gas mixture generating member 41 so that the conduction of heat from the gas mixture generating member 4 to the top end members 12a and 12b is restricted. A stopper 51 is circumferentially and discretely formed to the outer surface of both of the top end members 12a and 12b for restricting the position of the cap 6 mounted to the grip 1 as shown in FIG. 1 through FIG. 3, so that the pressure if results within the cap 6 may be escaped through the gap of the discontinuous stopper 51.

Figure 8:
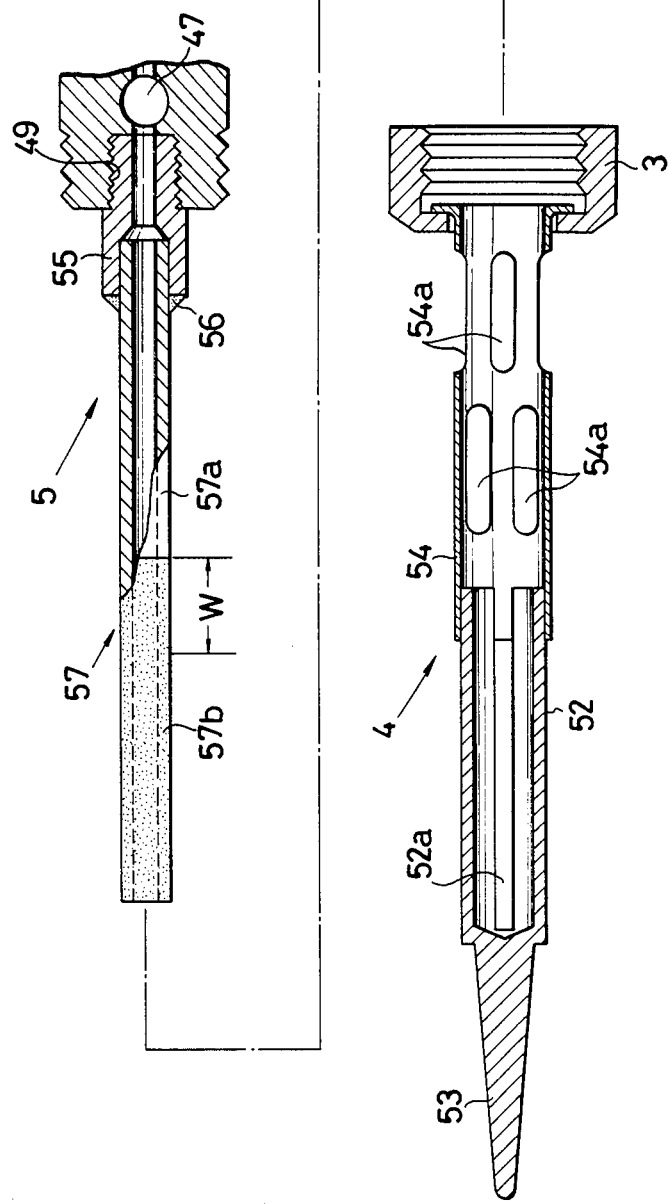
FIG. 8 is a cross sectional view showing the details of the soldering tip and the heating member.

Then, as shown in FIG. 1, FIG. 2 and FIG. 8, the iron tip member 4 is attached displaceably by means of the mounting nut to the top end of the gas mixture forming member 41. The iron tip comprises a cylindrical heating chamber 52 having a contact-type iron tip 53 at the top end and axial slits 52a at the circumferential surface thereof, and a connection pipe 54 made of stainless steel or the like which is integrally connected to the base end of the combustion chamber 52, for example, by spot welding and has air apertures 54a formed at the circumferential surface thereof.

Further, as also shown in FIG. 1, FIG. 2 and FIG. 8, the heating member 5 comprises a connection metal 55 displaceably screw-coupled into the female threads 49 formed at the top end of the gas mixture generating member 41, and a cylindrical catalyst chamber 57 which is secured to the connection metal 55, for example, by means of ceramic adhesives 56.

The catalyst member 57 has a tubular catalyst support 57a which is in communication with the gas mixture flow path in the gas mixture generating member 49, for example, as shown in FIG. 8 and it is made of mullite ceramics ($3Al_2O_3 \cdot 2SiO_2$) or alumina ceramics ($Al_2O_3$, more than 85%) (porous) with from 15 to 30% of water absorption (apparent porosity). A catalyst layer 57b which is composed of from 90 to 98% by weight of platinum and from 2 to 10% by weight of rhodium is deposited on the inner surface of the catalyst support 57a by way of an underlay gamma-alumina deposition film. The catalyst layer 57b is formed over a certain range (illustrated as the fine dot region) nearer to the top end of the catalyst support 57 (further details of the catalyst and the catalyst support are specifically described in our co-pending U.S. application Ser. No. 620,326, now U.S. Pat. No. 4,552,124, which is cited herein only for the reference).

In this way, the gas flow channel for the stream of the gas mixture from the gas generating member 41 is completely surrounded by and defined to the inside of the tubular catalyst support 57a.

A pre-heating zone W is formed at the outer surface of the tubular catalyst support 57a or the catalyst combustion chamber 57 as shown in FIG. 8. The preheating zone W is situated corresponding to the catalyst layer 57b deposited to the inner surface of the tubular support 57a at the position nearer to the base end portion thereof. To the pre-heating zone W, an appropriate flameless heating means 57c such as electrically heated nichrome alloy wires wound therearound, is provided so that the gas mixture flowing through the tubular support 57a may be pre-heated by the heat transmitted through the support wall.

OPERATION OF THE SOLDERING IRON

The operation of the soldering iron as one embodiment according to this invention will be described.

Upon use, the cap 6 is at first detached as shown in FIG. 2 and then the iron tip member 4 is detached by slackening the mounting nut 3 as shown by the broken line in FIG. 2.

Next, the control member 13 is caused to slide toward the top end of the grip 1. Then, the actuator 25 integrated with the control member 13 and the disc 27 situated at the top end slides along the axial hole 30a of the guide hole 30 as the guide against the resiliency of the spring 28. Then, after the disc 27 has abutted against the E-ring 26 mounted to the valve body 22 of the control valve 7, the valve body 22 is also caused to slide toward the top end against the resiliency of the return spring 40. At the position where the head 29a of the guide screw 29 integrated with the actuator 25 displaces to the top end of the axial hole 30a, the control valve 7 is fully opened. In this state, since the flow rate control member 18 is set to a minimum flow rate discharged state, no or little liquefied gas is discharged from the inside of the gas reservoir to the top end of the valve body 22.

Then, when the control member 13 is rotated circumferentially along the circumferential aperture 30b as the guide, since the actuator 25 and the flow rate control member 18 is integrated in the circumferential movement, the flow rate control member 18 is rotated in the direction of increasing the gas discharge flow rate and the gas mixture is jetted out in an amount proportion to the rotational amount from the top end of the valve body 22. In this case, the head 29a of the guide screw 29 situated in the circumferential aperture 30b contacts the corrugating portion at the top end of the positioning plate 38 as shown in FIG. 6. When the rotation of the control member 13 is stopped, the head 29a of the guide screw 29 is stably held at that position in contact with the bottom of the corrugating portion at the top end of the positioning plate 33. Since the actuator 25 is normally biased resiliently toward the base end by the spring 28, the head 29a is urged to the bottom and does not displace even if an incidental external force is applied more or less to the control member. Appropriate dials or indications (not illustrated) may be disposed at the portion where both of the top end members 12a, 12b and the control member 13 are opposed to each other for facilitating and securing the gas flow rate control by the control valve 7.

In this way, combustion gas discharged from the top end of the valve body 22 of the control valve 7 is jetted out through the filter 46 from the nozzle plate 44, in which the jetted gas attracts external air by the ejector action thereof through the air introduction aperture 47 to form a gas mixture of the combustion gas and the air. The gas mixture is directly supplied to the catalyst combustion chamber 57 of the heating member 5.

In this state, the pre-heating zone W on the catalyst support 57a is directly heated from the other side, for example, by supplying electric power from a built-in cell 57c to the nichrome alloy wire wound around the zone W. Then, the corresponding portion of the catalyst layer 57b is heated by the heat conducted through the wall of the catalyst support 57b to a temperature for starting the oxidizing reaction and flameless complete combustion is at first taken place at that portion.

After the flameless complete combustion is started at the pre-heating portion of the catalyst layer 57b, the entire catalyst layer 57b is gradually heated toward the top end to such a temperature sufficient for the catalytic oxidizing reaction, till flameless complete combustion has taken place over the entire region of the catalyst layer 57b only in about 3-5 sec after the ignition by the heater. In this way, the catalytic combustion of the liquefied gas can be taken place completely in a flameless manner from the start of the ignition and throughout the intended heat treatment.

Then, as shown by the dotted line in FIG. 2, the iron tip member 4 is mounted to the main body. The heating chamber 52 and the iron tip 53 is heated by the heat of the heating member 5 and, thereafter, the gas soldering iron can be used like the electrically heated soldering iron. The temperature for the iron tip 53 can easily be adjusted by merely controlling the gas flow rate.

The combustion exhaust produced after the complete combustion in the heating member 5 is discharged externally through the axial slits 52a disposed at two positions in the circumference of the heating chamber 52. Since a sufficiently large discharging area is secured for the exhaust by these two slits 52a, the combustion exhaust can be discharged extremely moderately thus resulting in no danger of burnt damages to fingers or the likes if they are incidentaly brought nearer to the heating member 5. Further, since the exhausts are thus discharged larterally, electronic devices such as semiconductor elements on a circuit substrate as the work to be heated are quite free from thermal damage.

If it is intended to use a different shape of iron tip, the mounting nut 3 is slackened to detach the iron tip member 4, which can be replaced with another one.

If it is required to increase or decrease the power of the heating member 5 substantially, the heating member 5 can also be exchanged with an appropriate one.

It is required that the catalyst layer 57b has an appropriate area to the amount of the gas mixture in order to take place a complete flameless combustion for the gas mixture supplied to the heating member 5.

It has been experimentally confirmed that whether the combustion area is appropriate or not can be determined by the heated color of the catalyst layer 57b during combustion. Specifically, if the area is appropriate for the amount of the gas mixture supplied, the catalyst layer 57b is turned red from the base end to the top end with an extreme top end portion being somewhat blackened as compared with other portions: This indicates that the gas mixture is almost burnt till it reaches the top end portion. While on the other hand, if the area of the catalyst layers 57b is insufficient as compared with the amount of the gas mixture, the entire portion of the catalyst layer 57b including the top end turns red. In this case, not-combustion gas may possibly be contained in the combustion exhaust. On the other hand, if the area of the catalyst layer 57b is too large as compared with the amount of the gas mixture, a substantial downstream portion of the catalyst layer 57b may remain black indicating that the gas mixture has already been burnt at the upstream completely. In this case, although the no-combustion gas is not discharged, this is not always so favorable since the complete combustion is taken place only at the base end portion but not at the top end of the catalyst layer 57b which is most effective to the heating of the iron tip 53.

Such a heated color of the catalyst layer 57b (exactly, the outer surface of the catalyst support 57a corresponding to the inner layer 57b) can always be monitored from the outside through the slits 52a formed through the heating chamber 52 and the temperature of the catalyst layer 57b and thus the iron tip 53 can easily be recognized.

Accordingly, the iron tip 53 can rapidly and stably be heated to a proper temperature, for example, by appropriately replacing the heating member 5.

Figure 9:
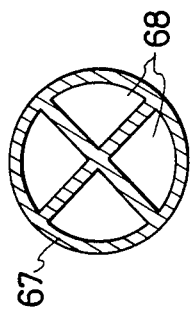
FIG. 9 is a cross sectional view of a catalyst member in another embodiment according to this invention.

FIG. 9 shows another embodiment of the catalyst combustion chamber in this embodiment, in which the catalyst combustion chamber 57 in the foregoing embodiment is replaced with a catalyst combustion chamber 67 having a plurality of through holes 68 axially (in the gas flowing direction) to the inside thereof.

Since such a structure can apparently increase the area of contact between the catalyst layer 57b and the gas mixture, a much greater amount of the gas mixture can be burnt completely. Further, with respect to a certain amount of the gas mixture, the length of the soldering catalyst chamber 67 and, thus, the entire length of the iron device can be reduced.

Figure 10:
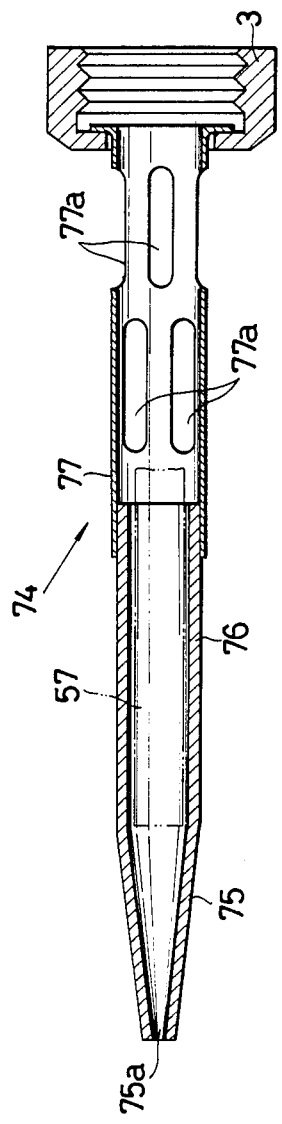
FIG. 10 is a cross sectional view of the soldering tip in a further embodiment according to this invention.

FIG. 10 shows further embodiment of this invention applied to a hot-blow tool, in which the contact type iron tip member 4 in the foregoing embodiment is replaced with a non-contact type iron tip member 74 that is adapted to discharge the combustion exhaust from the catalyst combustion chamber 57 as a hot blow that can be applied, for example, to heat sealing for heat-shrinkable resin pipes or the likes.

As shown in FIG. 10, the iron tip member 74 comprises a tapered cylindrical iron tip 75 having a hot blow exhaust port 75a at the top end thereof, a cylindrical heating chamber 76 integrated therewith and a connection pipe 77 made of stainless steel or the like integrally connected to the base end of the heating chamber 76, for example, by spot welding and having air slits 77a formed at the circumferential surface thereof. By the use of the combustion exhaust discharged from the hot blow exhaust port 75a, various hot blow fabrication can be conducted. In this embodiment, a smaller amount of hot blow at a higher temperature is obtained by reducing the area of the air slits 77a and, while on the other hand, a greater amount of hot blow at a lower temperature can be obtained by increasing the area of the air slits 77a formed in the connection pipe 77 by some adequate means, due to control for the amount of air attracted through the slits. Appropriate slits with an variable opening area may be disposed to the circumferential surface of the heating chamber 76, by which the heated color of the catalyst layer during combustion can be observed, as well as the temperature and the amount of the hot blow can be controlled in the same manner as in the air slits 77a.

In each of the foregoing embodiments, the pre-heating zone W on the catalyst support 57a is at first heated by a flameless ignitor while removing the iron tip member 4 or 74. This also enables to use a separate flameless ignition means while eliminating the use of the built in heater. However, the iron members 4, 74 needs not be detached if the cell-operated heater or the like is built-in the tool as described above.

Although flameless ignition is highly preferred, lighter or like other flaming ignitor may also be used if the situation permits.

Furthermore, although the initial heating is made to the base end portion of the catalyst layers 57b in the foregoing embodiment, it may be carried out also to the top end or entire portion for the catalyst layer 57b, while it is somewhat time consuming and troublesome for the complete flameless combustion over the entire catalyst layer 57b. Initial heating only for the top end of the catalyst layer 57, 67 is less desired since it may result in the flame from the top end.

In view of the safety handling, the attaching operation of the cap 6 may be interlocked with that of the control member 13, so that the cap can not be mounted in the state where the control member 13 is caused to slide toward the top end, that is, while the gas mixture being supplied. This can eliminate the danger of erroneously mounting the cap 6 to the heating member while the combustion is still taken place.

As described above specifically according to this invention, since the combustion catalyst is directly preheated upon start of the catalyst combustion to thereby heat the catalyst to the oxidizing reaction temperature without using flaming means, a complete flameless combustion can be taken place from the start of the combustion. Accordingly, the soldering iron or the like according to this invention can be used quite in the same manner and safely as that of the electrically heated soldering iron is those factories where the use of flaming tools is severely inhibited. The use of the present soldering iron heated by liquefied gas can also economize the gas power, simplify the structure and facilitate the handling.

What is claimed is:

1. An iron for heating a workpiece comprising:
   a nozzle for jetting out a combustible gas from a liquefied gas reservoir;
   a gas mixture generating means at the exit of said nozzle for drawing air to mix with said combustible gas to form a mixture;
   a catalyst combustion chamber downstream of said generating means having a gas flow channel extending therethrough with a catalyst layer deposited on the channel wall and a portion of the channel wall forming a pre-heating zone;
   means for directly and flamelessly heating the outer side of said chamber to heat said pre-heating zone to ignite said mixture; and
   a tip member at least partially surrounding the catalyst chamber for conducting the heat from said chamber to a workpiece.

2. The heating iron as defined in claim 1, wherein at least one of the catalyst chamber and the iron tip is made detachable and replaceable.

3. The heating iron as defined in claim 1, wherein a plurality of combustion exhaust openings are perforated through the circumferential surface of the iron tip.

4. The heating iron as defined in claim 1, wherein a combustion exhaust opening for discharging the combustion exhaust as a hot blow is disposed to the top end of the iron tip to thereby constitute a non-contact type iron.

5. The heating iron as defined in claim 1 wherein the catalyst combustion chamber comprises a tubular catalyst support chosen from the group consisting of porous mullite ceramics ($3Al_2O_3.2SiO_2$) and alumina ceramics ($Al_2O_3$) and the catalyst layer deposited on said catalyst support comprises from 90 to 98% by weight of platinum and from 2 to 10% by weight of rhodium.

* * * * *